United States Patent
Atkin et al.

(10) Patent No.: US 7,389,223 B2
(45) Date of Patent: Jun. 17, 2008

(54) METHOD AND APPARATUS FOR TESTING A SOFTWARE PROGRAM USING MOCK TRANSLATION INPUT METHOD EDITOR

(75) Inventors: Steven Edward Atkin, Austin, TX (US); Joseph C. Ross, Georgetown, TX (US); Minto Tsai, Austin, TX (US); Keiichi Yamamoto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/666,870

(22) Filed: Sep. 18, 2003

(65) Prior Publication Data

US 2005/0065772 A1  Mar. 24, 2005

(51) Int. Cl.
G06F 17/20 (2006.01)
G06F 9/44 (2006.01)

(52) U.S. Cl. .......................... 704/8; 717/124; 717/125

(58) Field of Classification Search ...................... None
See application file for complete search history.

(56) References Cited

U.S. PATENT DOCUMENTS 5,572,668 A * 11/1996 See et al. ..................... 714/38
5,583,761 A * 12/1996 Chou ........................... 715/536
6,185,729 B1 * 2/2001 Watanabe et al. ........... 717/100
6,425,123 B1 * 7/2002 Rojas et al. ................ 717/136
6,530,039 B1 * 3/2003 Yang ........................... 714/38

* cited by examiner

Primary Examiner—David Hudspeth
Assistant Examiner—Samuel G Neway
(74) Attorney, Agent, or Firm—Duke W. Yee; Justin M. Dillon; Wayne P. Bailey

(57) ABSTRACT

A method, apparatus, and computer instructions for testing software programs running on a data processing system. Text is translated from the source language to the target language to form translated text in response to a user input, containing the text in a source language. The text is entered through a computer interface in the data processing system. The translated text is inserted into a user interface of the software program to be tested to form inserted, translated text. The software program is written using the target language. A determination is made as to whether the software program functions correctly using the inserted, translated text.

8 Claims, 6 Drawing Sheets

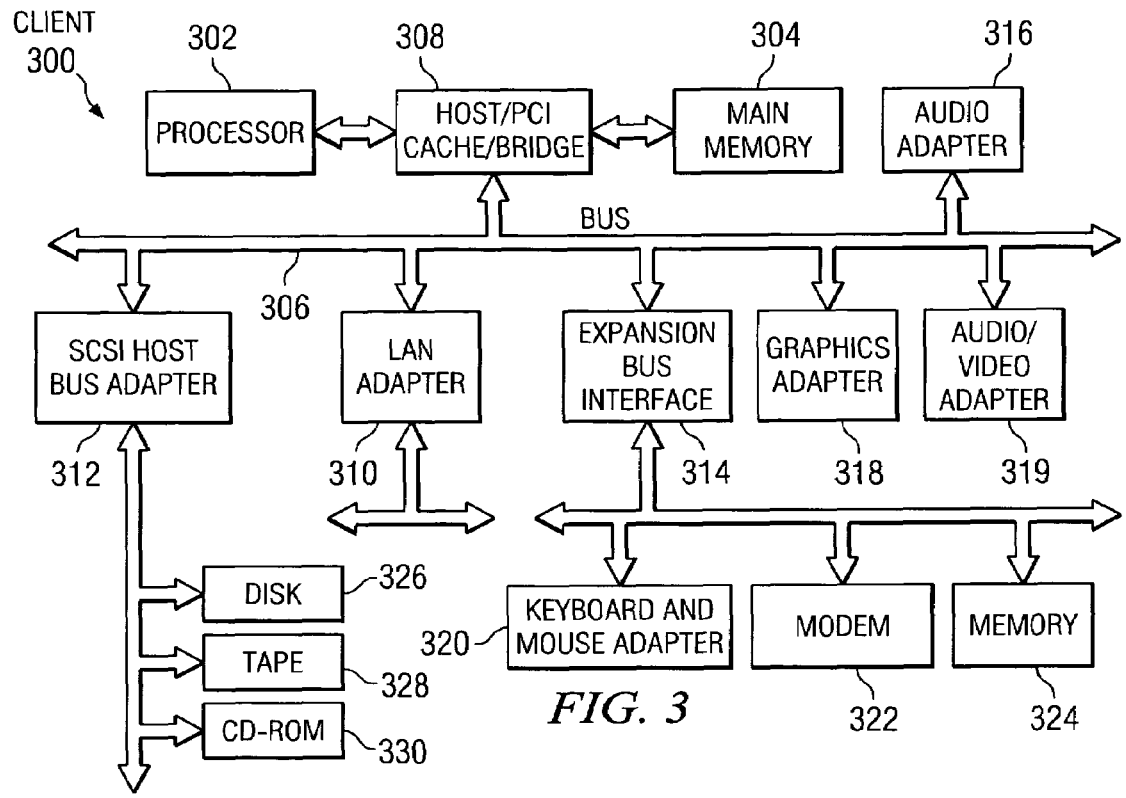
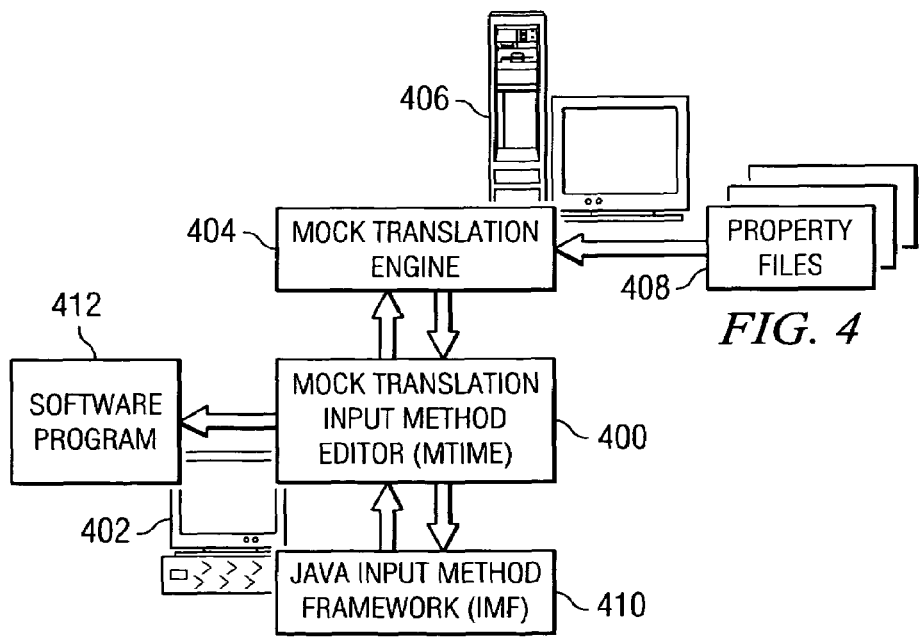

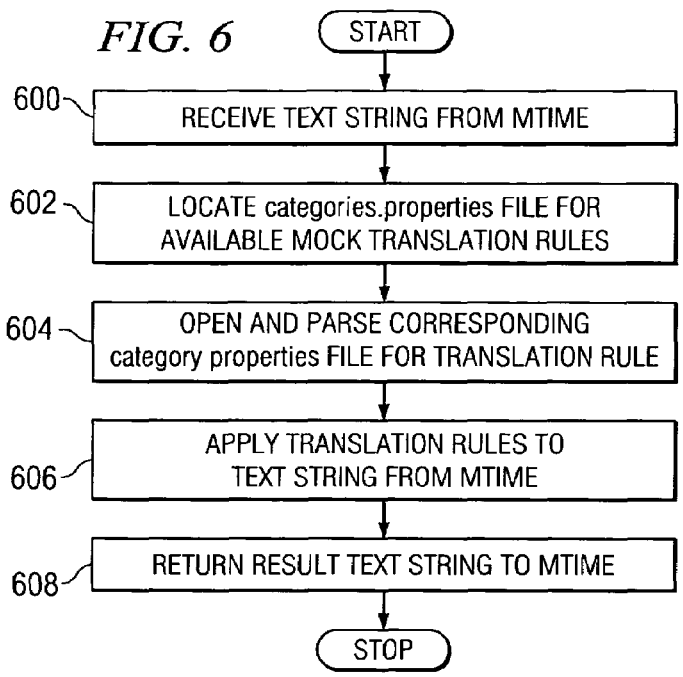
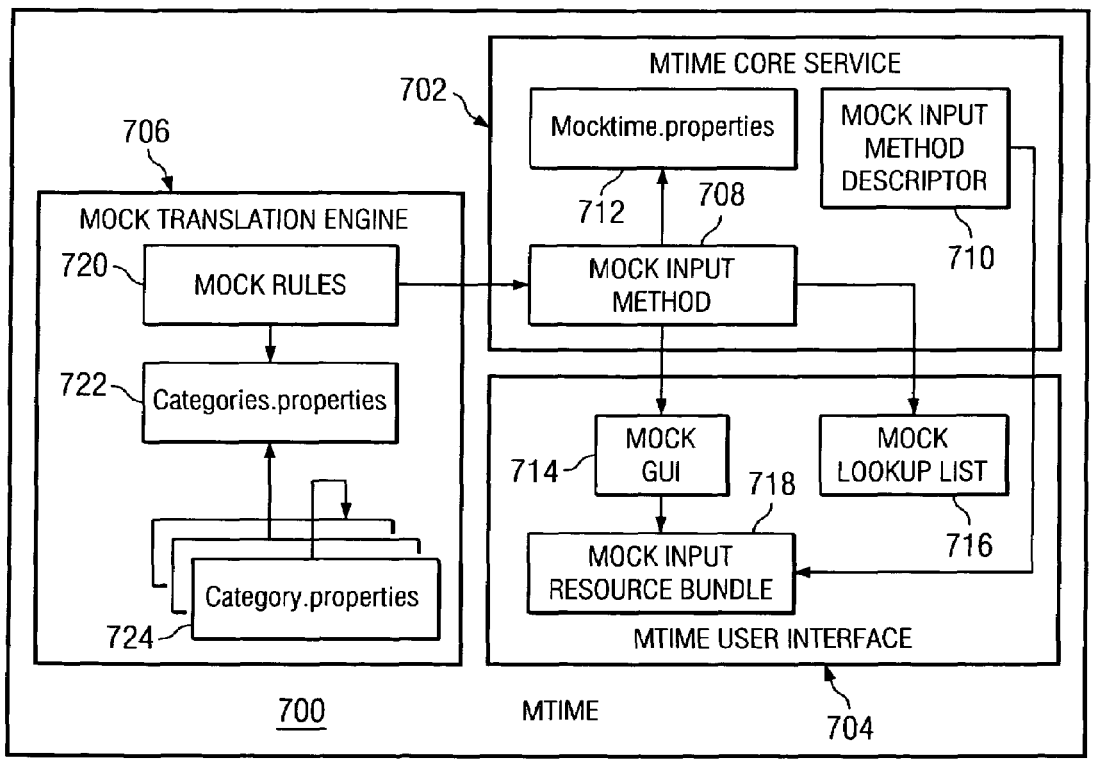

METHOD AND APPARATUS FOR TESTING A SOFTWARE PROGRAM USING MOCK TRANSLATION INPUT METHOD EDITOR

BACKGROUND OF THE INVENTION

1. Technical Field

The present invention relates generally to an improved data processing system and in particular to a method and system for testing software programs running on a data processing system. Still more particularly, the present invention relates to a method, apparatus, and computer instructions for testing a software program using mock translation input method editor (MTIME).

2. Description of Related Art

In the field of software testing, various approaches have been taken by current vendors of software programs to provide better test coverage. Support for internationalization becomes an important aspect of software testing to ensure compatibility with different locales, especially if software programs produced are available for users with native languages other than English.

Some software vendors use mock translation tools to perform global verification testing (GVT). A mock translation test simulates English text expansion and replaces or includes selected problematic characters such as character '~'. For example, a tilde, '~', may be appended to a single-byte language and the Japanese character for 10 (similar to a + sign) is appended for multi-byte languages. Problematic characters are inserted according to a chosen mock language. For example, if German is the chosen mock language, mock German replaces all characters 'a', 'u', 'o', and 'ss' with 'ä', 'ü', 'ö', 'β'. A phase such as "good morning" in German is translated as [~~~~gööd mörning] in mock German. Mock translation preserves English text as readable by the tester to enable an English user to execute global verification testing (GVT) without understanding other languages. The currently available mock translation tools help solve the problem of field expansion in the graphical user interface, column misalignment, line truncation, hard coded strings, and assembled messages.

However, using the currently available mock translation tools does not solve the problem of validating non-English data handling capabilities of software programs in the backend logic. Currently, an English speaking user has to manually enter non-English data by using the keyboard directly or by cutting and pasting non-English data from other scripts indirectly into the application for testing.

In order to enter non-English data using a keyboard, a user has to be trained on how to enter the problematic characters for different languages. The characters are difficult to learn because each vendor may have different text input methods for entering problematic characters. In addition, the user who uses the latter method needs to know which problematic characters to cut and paste in order to arrive at a mock translation. Alternatively, a tester who may use the native testing language may be employed to perform the testing.

The current approaches do not provide an easy to use solution to allow an English speaking user to generate non-English test data for software testing without a significant learning curve. The traditional approach of inserting non-English data into source code for testing also is not a good solution because source code has to be compiled each time the test data is changed.

Therefore, it would be advantageous to have an improved method, apparatus, and computer instructions for testing software programs by allowing a user to easily generate mock translation test data for different languages "on the fly" and to allow the user to enter test data for different languages into the software program without a significant learning curve.

SUMMARY OF THE INVENTION

The present invention provides a method, apparatus, and computer instructions for testing software programs running on a data processing system. Text is translated from the source language to the target language to form translated text in response to a user input, containing the text in a source language. This text is entered through a computer interface in the data processing system. The translated text is inserted into a user interface of the software program to be tested to form inserted, translated text. The software program is written using the target language. A determination is made as to whether the software program functions correctly using the inserted, translated text.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components for testing software program using mock translation input method editor in accordance with a preferred embodiment of the present invention;

FIG. 6 is a flowchart process for mock translation using mock translation engine in accordance with a preferred embodiment of the present invention;

FIG. 7 is a diagram of software components and their relationships of mock translation input method editor (MTIME) in accordance with a preferred embodiment of the present invention;

DETAILED DESCRIPTION OF THE PREFERRED EMBODIMENT

Figure 1:
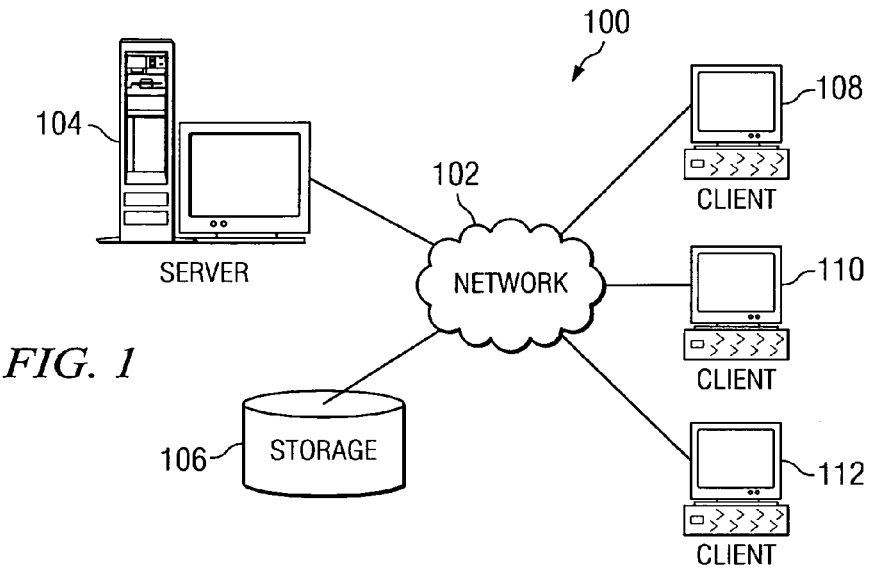
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
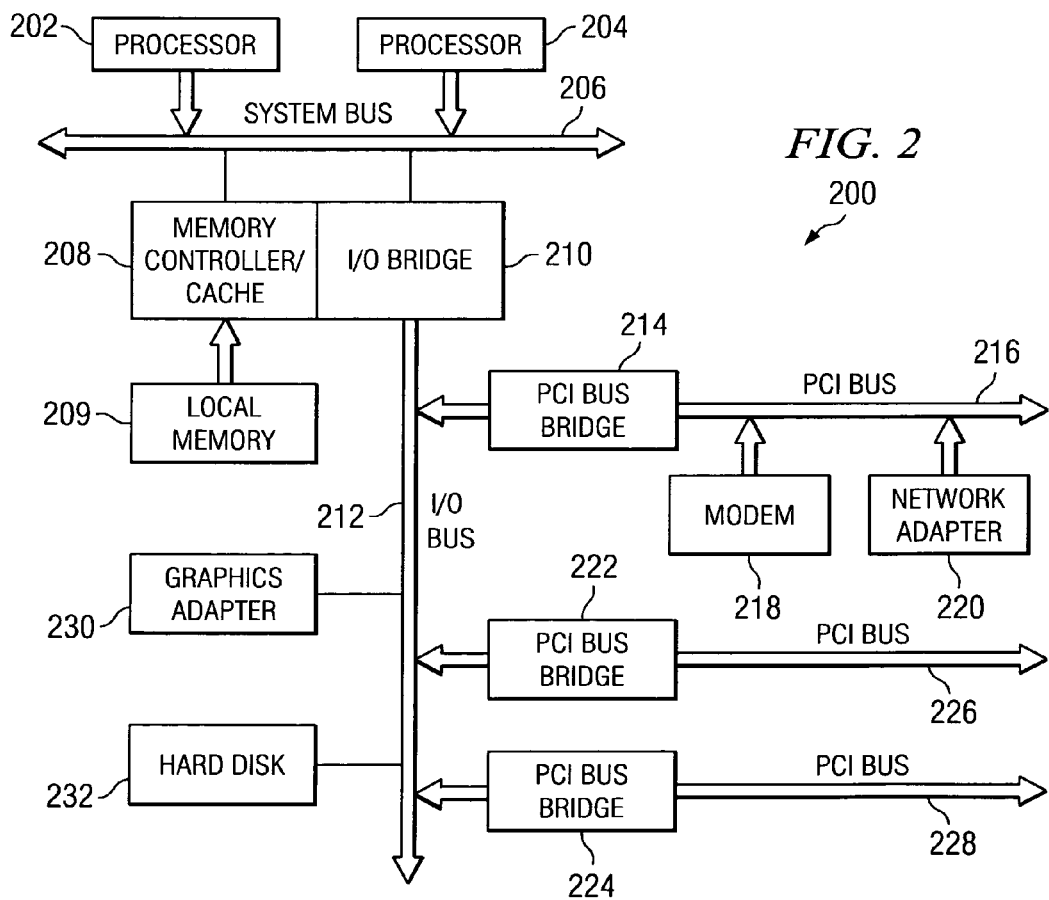
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for testing software programs using a mock translation input method editor (MTIME). The MTIME of the present invention includes a graphical user interface that allows the user to select an input method and language for mock translation. The MTIME also allows user to enter English text data to be mock translated into non-English text data. The user may choose a set of defined translation rules or look up possible mock translation candidates in a lookup window. Once a mock translated text is committed, the text data is sent to the software program running on the data processing system such as data processing system 300 in FIG. 3 as input test data to test a program or application.

Turning next to FIG. 4, a diagram illustrating components for testing software program using mock translation input method editor is depicted in accordance with a preferred embodiment of the present invention. As depicted in FIG. 4, in this illustrative implementation, mock translation input method editor (MTIME) 400 may include a graphical user interface running on data processing system 402. This data processing system may be implemented using data processing system 300 in FIG. 3.

Mock translation engine 404 is a software program that translates inputted text strings from MTIME 400 into mock translated strings. Mock translation engine 404 may be located on server 406, which may be implemented using server 104 in FIG. 1.

A set of translation rules and problematic characters may be defined using property files 408 that reside on server 406 in this example. Property files 408 contains configuration of MTIME 400 and rules for mock translation as defined by a user for customization. MTIME 400 uses Java input method framework (IMF) 410 in order to detect keyboard text entry from the user. IMF is a product available from Sun Microsystems, Inc.

Java (IMF) 410 enables collaboration between text editing components and input methods in entering text. Input methods are software components that let the user enter text using mechanisms other than simple typing on a keyboard. These methods are typically used for entering languages that have thousands of characters such as Japanese, Chinese or Korean, using keyboards with far fewer keys. Java IMF 410 also supports input methods for other languages, such as German. This component allows for the use of other input mechanisms, for example, handwriting or speech recognition. Java IMF 410 consists of two major interfaces, the input method client application program interface (API) and the input method engine service provider interface (SPI).

The input method client API provides interfaces and classes that enable text editing components to communicate with input methods and implement a well-integrated text input user interface, such as the MTIME 400. The input method engine SPI provides interfaces that enable the development of input methods in the Java programming language that can be used with any Java runtime environment. The mechanism of the present invention may be extended to other operating system native input methods, such as Windows application programming interface (API), a product from Microsoft Corporation or Unix custom input methods.

Upon detecting a text entry from the user, MTIME 400 running on data processing system 402 may send the inputted text string to mock translation engine 404 running on server 406 using a network communication protocol, such as TCP/IP or instant messaging protocol. Mock translation engine 404 applies translation rules and configuration of MTIME 400 stored in the property files 408 to the inputted text string and returns a result text string to MTIME 400. The result text string is displayed to the user in MTIME 400. Upon the user's response to select the result text string, the result mock translated text string is sent to the software program 412 running on data processing system 402 as non-English input test data.

Figure 5:
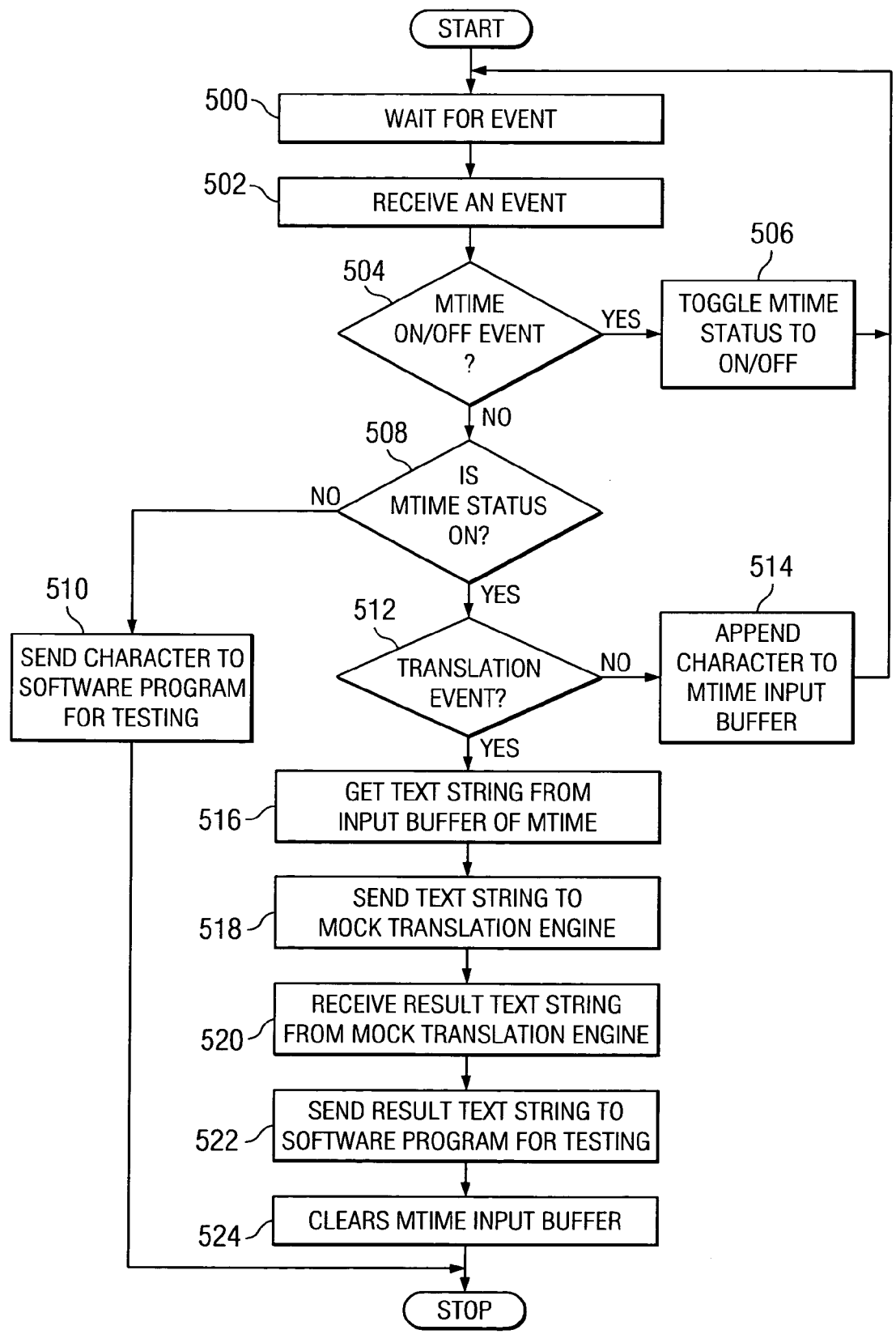
FIG. 5 is a flowchart process for testing a software program using mock translation input method editor (MTIME) in accordance with a preferred embodiment of the present invention.

Turning to FIG. 5, a flowchart process for testing a software program using mock translation input method editor (MTIME) is depicted in accordance with a preferred embodiment of the present invention. The process illustrated in FIG. 5 may be implemented in a MTIME, such as MTIME 400 in FIG. 4. The process begins by waiting for an event to occur (step 500). When the MTIME receives an event (step 502), a determination is made as whether the event is a MTIME ON/OFF event (step 504). If the event is a MTIME ON/OFF event, the status of the MTIME is toggled from ON to OFF or from OFF to ON (step 506), and the process then returns to step 500 where the MTIME waits for another event.

If the event is not a MTIME ON/OFF event, a determination is made as to whether the MTIME status is ON (step 508). If the MTIME status is not ON, the MTIME sends the character entered by the user to the software program for testing (step 510), and the process terminates thereafter. If the MTIME status is ON, a determination is made as whether the event is a translation event (step 512). A translation event is triggered when the user hits the 'Enter' key on the keyboard. If the event is not a translation event, the character entered by the user is appended to the MTIME input buffer (step 514) and the process returns to step 500 as described above.

If the event is a translation event, the MTIME retrieves the text string from the input buffer (step 516) and sends the text string to the mock translation engine (step 518). The mock translation engine may be implemented as mock translation engine 404 in FIG. 4.

Once the mock translation engine applies the translation rules and mock translates the text string, result text string is received from the mock translation engine (step 520), and the result text string is sent to the software program for testing (step 522). Next, the MTIME clears the input buffer where the input text string is stored (step 524), with the process terminating thereafter.

With reference now to FIG. 6, a flowchart process for mock translation using a mock translation engine is depicted in accordance with a preferred embodiment of the present invention. The process illustrated in FIG. 6 may be implemented in a mock translation engine, such as mock translation engine 404 in FIG. 4. The process begins by receiving a text string from the mock translation input method editor (MTIME) (step 600).

This step is initiated by step 518 in FIG. 5. Next, the mock translation engine locates the categories.properties file in this example where available translation rules are predefined (step 602). For example, the categories.properties file may contain categories such as Wide Roman or Martian. Formats of configuration files other than ".properties" may also be used to store configuration options, such as ".xml", ".html", and ".txt".

Based on the category selected by the user in the MTIME, the corresponding category.properties file is opened and parsed to obtain translation rules (step 604). For example, a WideRoman.properties file is opened and parsed to obtain associated translation rules. Once the category.properties file is opened and parsed in step 604, associated translation rules are applied to text string from MTIME to perform mock translation(step 606). Associated translation rules include options for expansion, bookend, character replacement, and scrambling. Finally, the result text string from the mock translation is returned to the MTIME (step 608) with the process terminating thereafter.

The configuration files of the present invention provide flexibility to dynamically configure a mock translation rule by adding or deleting an entry with name and description of the translation rule in the categories.properties file. Moreover, a user may change mock translation rules in the category.properties file at any time to apply new settings by restarting the MTIME when a translation rule is changed according to a preferred embodiment of the present invention.

Turning next to FIG. 7, a diagram of software components and their relationships of mock translation input method editor (MTIME) is depicted in accordance with a preferred embodiment of the present invention. As depicted in FIG. 7, in this illustrative implementation, MTIME 700 includes three components: MTIME core service 702, MTIME user interface 704 and mock translation engine 706.

The MTIME core service 702 includes mock input method 708, mock input method descriptor 710, and mockime.properties file 712. Mock input method 708 and mock input method descriptor 710 are interfaces for implementing the Java input method framework (IMF). Mock input method descriptor 710 communicates important characteristics of the MTIME to the Java IMF. Mock input method 708 handles key events and controls the state transition. Next, mockime.properties file 712 defines key sequences for the MTIME such as activation or deactivation, conversion trigger, commit trigger, and deletion of characters.

MTIME user interface 704 consists of the mock GUI 714, mock lookup list 716, and mock input resource bundle 718. These components provide the user interface for the MTIME control window and the look up list window, which pops up when the user chooses the look up window option.

Mock translation engine 706 may be implemented locally on the data processing system such as data processing system 402 in FIG. 4 or remotely on a server such as server 404 in FIG. 4. Mock translation engine 706 includes mock rules 720, categories.properties file 722, and individual category.properties files 724. As described in FIG. 6, categories.properties 722 and category.properties 724 files define available translation rules and configuration options for the MTIME. Mock rules 720 serves as an interface between categories.properties 722 file and mock input method 708 where the input strings from the user are mock translated.

Figure 8:
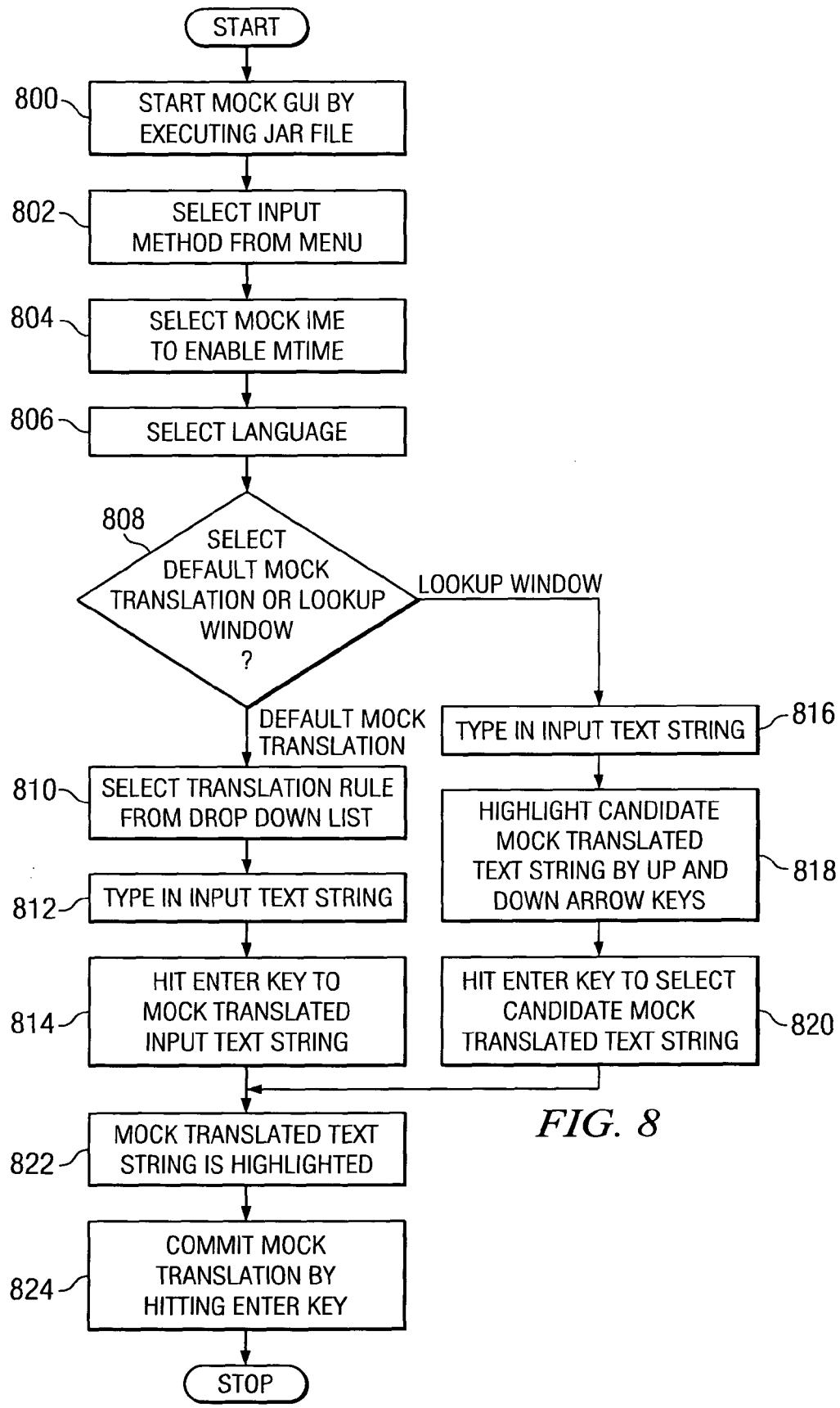
FIG. 8 is a flowchart process of mock translation using the MTIME user interface in accordance with a preferred embodiment of the present invention.

Next in FIG. 8, a flowchart process of mock translation using the MTIME user interface is depicted in accordance with a preferred embodiment of the present invention.

As depicted in FIG. 8, in this example implementation, from the user's perspective, the process begins when the user starts the mock user interface by executing the .jar file (step 800). When the mock user interface is opened, the user selects the option 'Select Input Method' from the top menu (step 802). Once the user selects the 'Select Input Method' option from the top menu, the user selects the 'Mock IME' option from a popup menu to enable the MTIME (step 804).

When the 'Mock IME' option is selected, a Mock IME user interface is opened with components that allow the user to customize mock translation. The user may enable or disable the MTIME by clicking the 'Click to enable' or 'Click to disable' button of the Mock IME user interface. Next, a user may select a language from a drop down list of the Mock IME user interface (step 806). For example, the German language may be selected by the user. Other language options are also available to be selected at any time while the Mock IME user interface is opened.

A determination is made by the user as whether to select a default mock translation rule or a mock translation lookup window (step 808). If the default mock translation rule is selected, the user may select the translation rule available from the drop down list of the Mock IME user interface (step 810). For example, the translation rule may be Wide Roman. Other translation rules may also be selected at any time by the user in the Mock IME user interface. Once a translation rule is selected, the user may type in a text string using a keyboard into the MTIME (step 812).

An example input text string is 'Sample text 1'. When a text string is input, the user may hit the 'Enter' key of the keyboard to initiate mock translation of the input text string (step 814). Step 814 triggers the mock translation engine, such as mock translation engine 706 in FIG. 7 to start the translation process.

If the user chooses the mock translation lookup window option in step 808, the user may type in an input text string by using the keyboard into the MTIME (step 816). An example input text string is 'Sample text 1'. A popup lookup window is displayed when the user types in an input text string with possible candidate mock translated text strings. A user may highlight one of the possible candidate mock translated text strings (step 818). This selection may be made in this example through the up and down arrow keys of the keyboard. Next, the user may select the highlighted mock translated text string by hitting the 'Enter' key of the keyboard (step 820).

When the user hits the 'Enter' key from either the default mock translation rule in step 814 or the mock translation lookup window in step 820, the mock translated text string is highlighted in the MTIME (step 822). An example mock translated text string from the above input text string for mock language German is [~~~~~~~~~~~~Sämplë tëxt 1.]

Finally, the user may commit the highlighted mock translated text string to be sent to the application for testing when the user hit the 'Enter' key again on the keyboard (step 824) with the process terminating thereafter.

Figure 9:
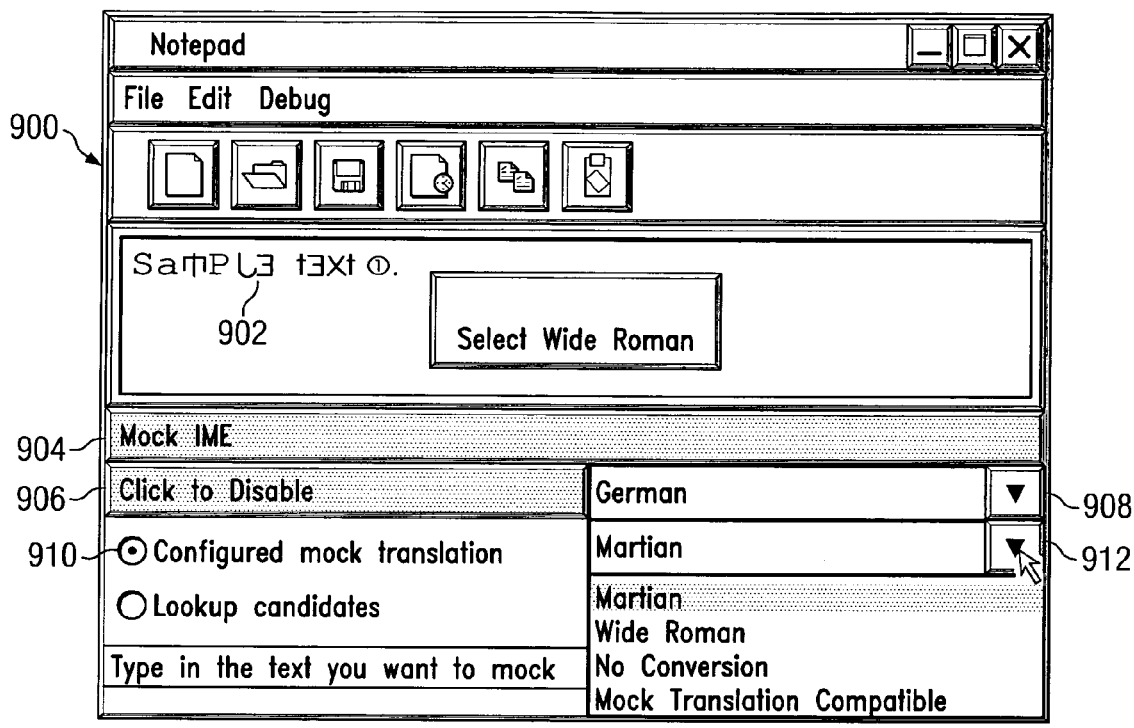
FIG. 9 is a diagram of MTIME and mock IME user interface using default mock translation rule in accordance with a preferred embodiment of the present invention.

Turning next to FIG. 9, a diagram of MTIME and mock IME user interface using default mock translation rule is depicted in accordance with a preferred embodiment of the present invention. As illustrated in FIG. 9, MTIME window 900 is opened when the user executes a jar file. Text area 902 allows the user to type in text strings for mock translation. When the user enables Mock IME, mock IME user interface 904 is opened. The user may disable mock IME, at any time by clicking on 'Click to disable' button 906 of mock IME user interface 904.

The target language may be selected at any time using the drop down list of the mock IME user interface 908. Once a language is chosen, the user may select 'configured mock translation' option 910 for default mock translation rule. When 'configured mock translation' option 910 is enabled, the user may select one of the available translation rules from the drop down list 912 of the mock IME user interface. Drop down list 912 is populated with available translation rules stored in the categories.properties file.

Figure 10:
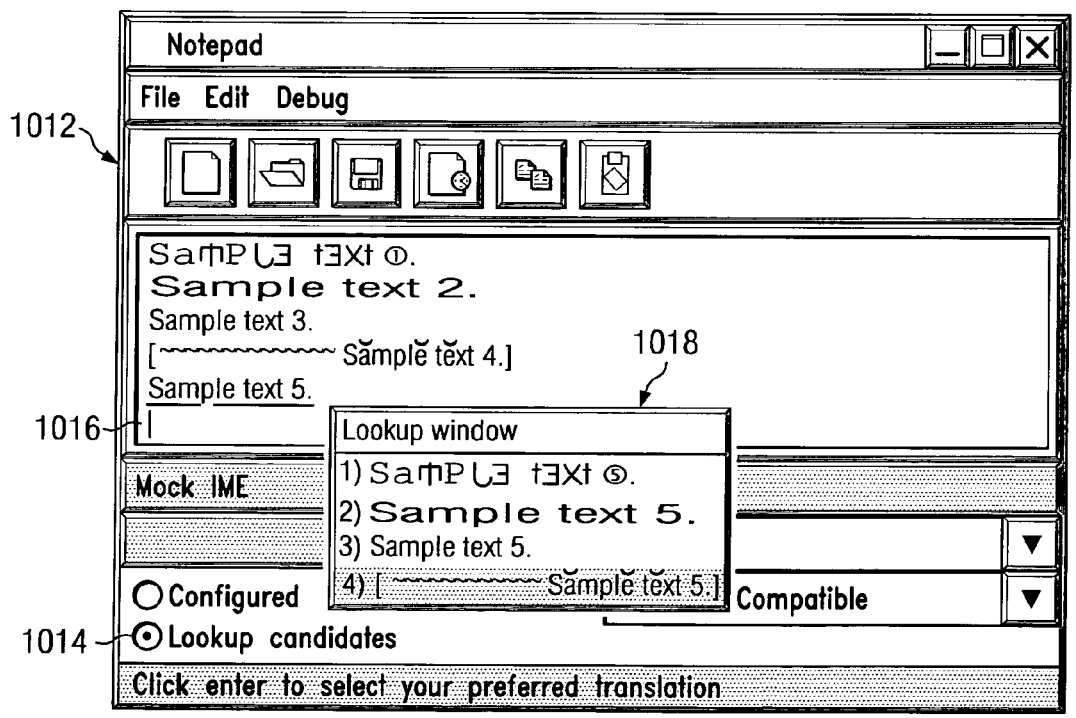
FIG. 10 is a diagram of MTIME and mock IME user interface using mock translation lookup window in accordance with a preferred embodiment of the present invention.

Turning next to FIG. 10, a diagram of MTIME and mock IME user interface using mock translation lookup window is depicted in accordance with a preferred embodiment of the present invention. In this illustrative example, MTIME window 1012 is opened when the user executes the jar file. A user may select 'Lookup candidates' option 1014 at any time to select the mock translation lookup window option. The user may then type in a text string such as text string 'Sample text 5' 1016. In response to the user typing in the text string look up window 1018 contaching with possible candidates of mock translated string appears at the cursor of input text string 1016. The mock translated string in this example is [~~~~~~~~~~~Sämplë text 5.].

Thus, the present invention solves the problem of testing software program for support of internationalization by providing a mock translation input method editor (MTIME) to mock translate English text entered by the user into non-English text, in order to perform global verification testing (GVT) for software programs. The MTIME of the present invention does not require mock-translated text to be entered and compiled in the source code in order to test the backend logics of the software program.

In addition, no modification in the software program application is required using the mechanism of the present invention because the Java input method framework (IMF) provides a rich set of text components that integrates with the target software program application. Furthermore, the MTIME in this example implementation uses the Java programming language and runtime environment that enables platform independence without a significant learning curve for the tester or vendor.

The MTIME also enables the mock translated text to be readable by the user so that English tester can perform global verification testing and detect problems efficiently. The MTIME also enables the configuration of the translation rules and problematic characters to be changed dynamically by allowing user to modify a corresponding properties file at any time. By restarting the MTIME, changes made are applied immediately in the illustrative examples. The innovative features of the present invention provides a highly configurable global verification testing tool of software programs to be performed by English tester "on the fly" regardless of language, translation rules, and platforms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for testing a software program, the method comprising the computer implemented steps of:

responsive to a user input containing text in a source language, entered by a user through a computer graphical user interface screen presented to the user by the computer, translating the text from the source language to a target language to form translated text;

displaying the translated text on the computer graphical user interface screen, wherein the computer graphical user interface screen includes options presented on the computer graphical user interface screen for the user to select both a source language and a translation mode at any time, wherein the translation mode includes a default translation mode and a lookup translation mode that are selectable by the user, wherein the lookup translation mode displays a popup window with a plurality of possible translated text inputs that are selectable by the user;

inserting the translated text into a user interface of the software program to be tested to form inserted, translated text, wherein the software program is written in the target language, and wherein the inserting step is initiated in response to another user input to commit the translated text displayed on the computer graphical user interface screen; and determining whether the software program functions correctly using the inserted, translated text.

2. The method of claim 1, wherein the computer graphical user interface screen includes an option for the user to enable and disable translation of the text.

3. The method of claim 1, wherein the target language includes one of a single-byte language or a multi-byte language.

4. The method of claim 1, wherein the translating step uses a set of translation rules.

5. The method of claim 4, wherein a set of translation rules may be defined in a configuration file by a user at any time, wherein the configuration file is a separate file that does not contain the text.

6. The method of claim 4, wherein a set of translation rules may be applied upon restarting of the computer graphical user interface screen.

7. The method of claim 1, wherein the translating step comprises:

preserving selected source language characters in the text; and replacing selected source language characters with target language characters.

8. The method of claim 1, wherein translating step is performed using a set of instructions and configuration files in a network data processing system.

* * * * *